Apr. 17, 1923.  
T. L. LEE  
TEST BENCH  
Filed Nov. 24, 1919

1,451,992

Inventor  
Thomas L. Lee  
by his attorney  
Farnum F. Dorsey

Patented Apr. 17, 1923.

1,451,992

UNITED STATES PATENT OFFICE.

THOMAS L. LEE, OF ROCHESTER, NEW YORK, ASSIGNOR TO NORTH EAST ELECTRIC COMPANY, OF ROCHESTER, NEW YORK, A CORPORATION OF NEW YORK.

TEST BENCH.

Application filed November 24, 1919. Serial No. 340,366.

*To all whom it may concern:*

Be it known that I, THOMAS L. LEE, a citizen of the United States, residing at Rochester, in the county of Monroe and State of New York, have invented certain new and useful Improvements in Test Benches; and I do hereby declare the following to be a full, clear, and exact description of the invention, such as will enable others skilled in the art to which it appertains to make and use the same.

This invention relates to means for testing electric generators, motors, and other apparatus with respect to output, torque, and other characteristics.

An object of the invention is to produce a test-bench or apparatus, of simple, compact and convenient form, having provision for driving the device or devices which are to be tested at variable speed, and for conveniently supporting such devices in proper alignment and connection with the drive-mechanism. A further object is to provide the test-bench with simple and convenient means for testing the torque of a machine without changing its mounting or position on the bench.

To the foregoing ends the invention consists in the test-bench hereinafter described, and illustrated in the accompanying drawings, as it is defined in the annexed claims.

Figure 1:
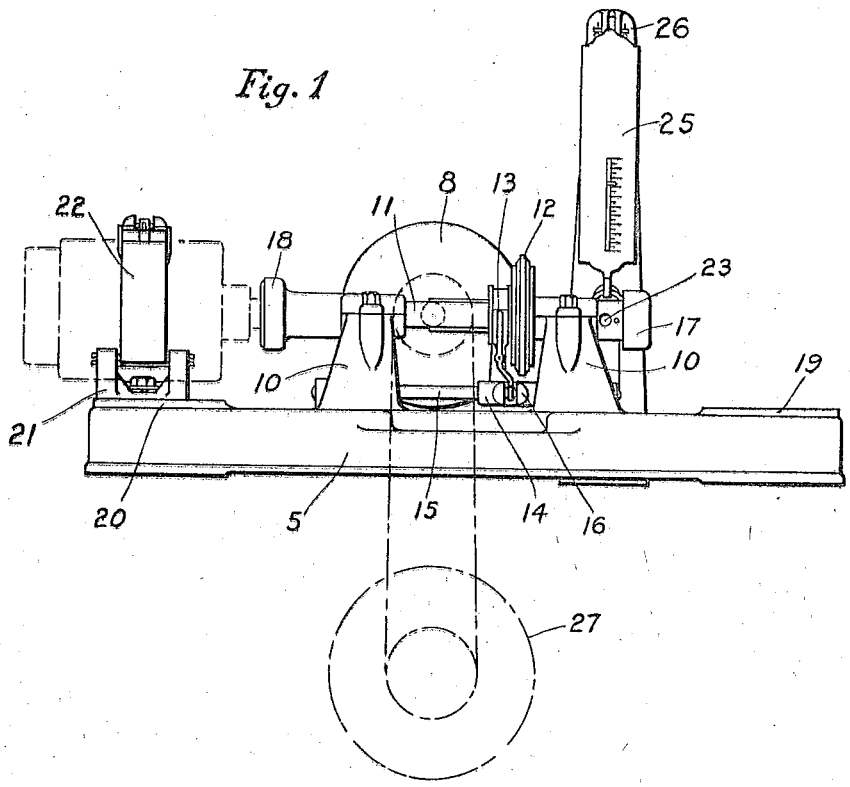
Figure 2:
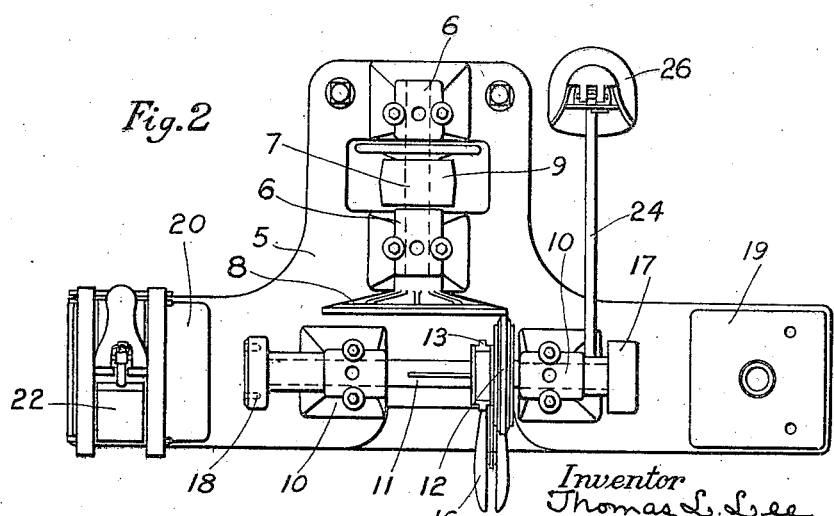

In the accompanying drawings Fig. 1 is a front-elevation of a test bench embodying the present invention, and Fig. 2 is a plan-view of the same.

The invention is illustrated as embodied in a test bench having a base casting 5. From this base rises two columns 6 provided, at their upper ends, with bearings for a horizontal power-shaft 7. The power-shaft is provided, at its forward end, with a flat friction-disc 8, and with a pulley 9 located between the columns.

Two more columns 10, rising from the base, provide bearings for a horizontal transverse drive-shaft 11. A friction-wheel 12 is splined upon the drive-shaft, and its periphery is held in engagement with the friction-disc 8, so that rotation is transmitted from the power-shaft to the drive-shaft. The grooved hub of the friction-wheel is embraced by a fork 13, projecting from a slide 14 which moves upon a horizontal rod 15 mounted in the columns 10. By means of a handle 16 the slide may be moved so as to vary the point of engagement of the friction-wheel with the disc, and thus vary the speed of rotation imparted to the drive-shaft from zero to a maximum. The details of the means for regulating the pressure of engagement between the friction-members and of the means for retaining the slide in its adjusted positions are not shown and described, as they may be of any form well-known in friction-drive mechanisms of the type in question.

The ends of the shaft 11 project beyond the columns 10, and each end is provided with a coupling-member, these members 17 and 18 being of any suitable form for coupling the drive-shaft with the armature-shaft of an electric motor or generator or other device which is to be tested. The base 5 is also provided, in alignment with the drive-shaft, with two seats 19 and 20, adapted for the support of the machines to be tested. These seats are perforated to receive bolts or other fastening devices, and one or more cradles are preferably provided, to be mounted removably upon one or the other of the seats. A cradle 21 is shown on the seat 20, this cradle being provided with a toggle-strap 22 by which a motor or generator may be secured in place on the cradle, as shown in broken lines in Fig. 1.

The power-shaft may be belted, by means of a pulley 9, to any suitable source of power such, for example, as the electric motor 27 shown in broken lines in Fig. 1. A generator to be tested may thus be driven at any speed desired. In the case of an electric motor, it is desirable to be able to test the torque, and for this purpose the coupling 17 is transversely perforated to receive a torque-arm 24, which is inserted loosely in the perforation and attached at its outer end to a spring-balance 25, this balance being supported by a suitable column 26.

By the arrangements just described either the torque or the output of a dynamo-electric machine, mounted on either of the seats, may be tested, or two such machines may be driven or tested simultaneously, and at any speed adapted to the requirements of the test. The device is thus particularly adapted for use in a service or repair-shop, or wherever machines of a variety of forms and sizes are to be tested.

The invention is not limited to the embodiment thereof hereinbefore described, but may be embodied in various other forms within the scope of the following claims.

The invention claimed is:

1. A test-bench comprising: a frame provided with two base-members, each adapted to support a dynamo-electric machine, and with two bearings for a drive-shaft; a horizontal drive-shaft rotatable in said bearings and with its ends located adjacent to but above said base-members; coupling-members on the ends of the drive-shaft; a friction-wheel carried by the drive-shaft, between said bearings, and rotatable with but slidable upon the drive-shaft; and a frictional power-member rotatable in contact with said friction-wheel.

2. A test-bench comprising: a horizontal shaft; means for supporting a dynamo-electric machine in alinement with said shaft; means for driving the shaft; a coupling, on the end of the shaft, for connecting it with the armature-shaft of such dynamo-electric machine, the coupling having a transverse socket; and a lever removably fitting said socket and adapted for use in testing torque.

THOMAS L. LEE.